UNITED STATES PATENT OFFICE.

ERNST MECKBACH, OF OPLADEN, NEAR COLOGNE, GERMANY, ASSIGNOR TO SYNTHETIC PATENTS CO., INC., OF NEW YORK, N. Y., A CORPORATION OF NEW YORK.

COLOR-LAKES FAST TO LIGHT.

1,203,642.

Specification of Letters Patent.

Patented Nov. 7, 1916.

No Drawing.

Application filed May 14, 1915. Serial No. 28,104.

*To all whom it may concern:*

Be it known that I, ERNST MECKBACH, doctor of philosophy, chemist, citizen of the German Empire, residing at Opladen, near Cologne, Germany, have invented new and useful Improvements in Color-Lakes Fast to Light, of which the following is a specification.

I have found that new and valuable pigments or lakes distinguished by their excellent fastness to light can be obtained by converting into lakes or pigments basic dyes together with anthraquinone coloring matters, such as polyhydroxyanthraquinone dyes, in the presence of hydrate of alumina. Alizarin, alizarin vat dyes or acid alizarin dyes dyeing directly or on a mordant can be used.

In order to illustrate the new process more fully the following example is given, the parts being by weight:—50 parts barite, 10 parts sulfate of aluminum, 4 parts calcined sodium carbonate, 1 part alizarin sapphirol (diaminoanthrarufin disulfonic acid), 0.6 parts of rhodulin yellow 6G (alkylized dehydrothiotoluidin). The barite is stirred up with water, the other ingredients are dissolved in boiling water and added one after another to the barite, then the lake is filtered off and washed. A green lake fast to light is thus obtained.

Other dyestuffs may be used, for example, on the one hand hexaoxyanthrachinon, oxyarylaminoanthrachinonsulfo acid, tolylaminoanthrapyridonsulfo acid, and on the other hand tetramethyldiaminoorthodiphenazthioniumchlorid, etc.

I claim:—

1. The new color lakes comprising in combination a basic dye, an anthraquinone coloring matter and aluminum, said lakes being distinguished by their great fastness to light, substantially as described.

2. The new color lakes comprising in combination a basic dye, an aminoanthraquinone sulfonic acid compound and aluminum, said lakes being distinguished by their great fastness to light, substantially as described.

3. The new color lakes comprising in combination an alkylized dehydrothiotoluidin, a polyhydroxyanthraquinone coloring matter and aluminum, said lakes being distinguished by their great fastness to light and purity of color, substantially as described.

4. The new color lakes comprising in combination an alkylized dehydrothiotoluidin, an aminoanthraquinone sulfonic acid compound and aluminum, said lakes being distinguished by their great fastness to light and purity of color, substantially as described.

5. The new color lakes comprising in combination an alkylized dehydrothiotoluidin, an aminooxyanthraquinone sulfonic acid and aluminum, said lakes being distinguished by their great fastness to light and purity of color, substantially as described.

6. The new color lakes comprising in combination an alkylized dehydrothiotoluidin, diaminoanthrarufin disulfonic acid and aluminum, said lake having a green color distinguished by its great fastness to light, substantially as described.

In testimony whereof I have hereunto set my hand in the presence of two subscribing witnesses.

ERNST MECKBACH. [L. S.]

Witnesses:
HELEN NUFER,
ALBERT NUFER.